United States Patent
Kraemer

(10) Patent No.: US 6,652,200 B2
(45) Date of Patent: Nov. 25, 2003

(54) TOOL HOLDER WITH COOLANT SYSTEM

(76) Inventor: Rolf H. Kraemer, P.O. Box 297, Edinboro, PA (US) 16412

( * ) Notice: Subject to any disclaimer, the term of this patent is extended or adjusted under 35 U.S.C. 154(b) by 101 days.

(21) Appl. No.: 10/000,999

(22) Filed: Nov. 1, 2001

(65) Prior Publication Data

US 2003/0082018 A1 May 1, 2003

(51) Int. Cl.⁷ .................. B23B 27/22; B23P 15/28
(52) U.S. Cl. .................................. 407/11; 407/104
(58) Field of Search ................ 407/5, 11, 104, 407/105

(56) References Cited

U.S. PATENT DOCUMENTS

| | | | | |
|---|---|---|---|---|
| 3,842,470 A | * | 10/1974 | Hertel | 407/86 |
| 4,714,384 A | * | 12/1987 | Lagerberg | 407/103 |
| 4,829,859 A | * | 5/1989 | Yankoff | 82/1.11 |
| 4,934,878 A | * | 6/1990 | Plutschuck et al. | 407/42 |
| 4,940,369 A | * | 7/1990 | Aebi et al. | 407/42 |
| 4,955,264 A | * | 9/1990 | Armbrust | 82/158 |
| 5,148,728 A | * | 9/1992 | Mazurkiewicz | 82/1.11 |
| 5,237,894 A | * | 8/1993 | Lindeke | 82/1.11 |
| 5,340,242 A | * | 8/1994 | Armbrust et al. | 407/11 |
| 5,388,487 A | * | 2/1995 | Danielsen | 82/158 |
| 5,718,156 A | * | 2/1998 | Lagrolet et al. | 82/1.11 |
| 5,775,854 A | * | 7/1998 | Wertheim | 407/11 |
| 5,901,623 A | * | 5/1999 | Hong | 82/50 |
| 5,947,648 A | * | 9/1999 | Friedman et al. | 407/5 |
| 6,045,300 A | * | 4/2000 | Antoun | 407/11 |
| 6,053,669 A | * | 4/2000 | Lagerberg | 407/11 |
| 6,299,388 B1 | * | 10/2001 | Slabe | 407/11 |
| 6,312,199 B1 | * | 11/2001 | Sjoden et al. | 407/11 |
| 6,394,709 B1 | * | 5/2002 | Sjoo et al. | 407/2 |
| 6,443,672 B1 | * | 9/2002 | Lagerberg | 407/2 |
| 6,471,448 B1 | * | 10/2002 | Lagerberg | 407/2 |
| 2002/0127067 A1 | * | 9/2002 | Lagerberg | 407/11 |
| 2002/0131830 A1 | * | 9/2002 | Sjoo et al. | 407/105 |

* cited by examiner

*Primary Examiner*—A. L. Wellington
*Assistant Examiner*—Brian D. Walsh
(74) *Attorney, Agent, or Firm*—Richard K. Thomson

(57) ABSTRACT

Fluid passageways are defined by the top plate, tool holder body and the cutting insert to permit the optimum cooling of the interface between the insert and the work piece reducing degradation of the cutting edge of the insert. A number of top plate designs with channel configurations are disclosed to provide the desired coolant flow distribution and accommodate the desired flow rate.

13 Claims, 3 Drawing Sheets

TOOL HOLDER WITH COOLANT SYSTEM

BACKGROUND AND SUMMARY OF THE INVENTION

The present invention is a cutting tool holder for an insert used with a lathe or the like. More particularly, the present invention is directed to a tool holder which incorporates a fluid passageway to direct coolant to at least one critical zone of the insert.

In rotary cutting of metal work pieces such as on a lathe, or the like, the life of the cutting tool insert is an important factor in determining 1) the number of work pieces completed in a fixed time period, and 2) the cost of operating the machine. A determining factor in wear life of the insert is the effectiveness of the coolant in preventing the interface of the cutting tool insert and work piece from reaching elevated temperatures. A number of coolant systems have been devised in an attempt to remove heat from this interface and, thereby, extend tool life. The chief problem with most of these systems is that the delivery system is too far from the interface. This results in ingestion of air into the flow stream which significantly detracts from the cooling effectiveness of the fluid coolant. Further, the more distant the delivery point is from the interface, the lower the percentage of coolant that will actually contact the interface. These two factors detract from the overall efficiency of these cooling systems.

One patent attempts to remedy these problems by providing the insert with a passageway through which high pressure fluid is directed. This patent, U. S. Pat. No. 5,237,894 issued to Lindeke, can get fluid near the interface but, obviously, can not focus coolant fluid directly at the interface between the cutting edge and the work piece without compromising the integrity of the cutting edge. A second patent, U. S. Pat. No. 6,053,669 to Lagerberg, uses a porous material for the insert. This patent also cannot focus a stream of coolant fluid at the interface; in addition, the fluid can only ooze out of this porous material. A fluid stream is not possible due to the material itself offering resistance. In addition, while Lagerberg hopes to avoid the clogging of a passageway by contamination in the coolant fluid, the presence of sludge from bacteria, large particles and/or small chips, in the supply line will result in clogging of the system and blocking off of flow into the porous insert.

The tool holder with coolant system of the present invention overcomes these defects by using portions of the holder to channel the coolant and focus the delivery point(s) toward at least one critical zone of the cutting tool insert. These critical zones may include, for example, a first and a second cutting edge and a nose portion positioned between the two cutting edges. The coolant system can be designed to handle either high or low pressure fluid delivery. The tool holder of the present invention includes a tool holder body, the body having a recess formed therein; a cutting tool insert seated in the recess, the insert having at least one critical zone; a top plate at least partially overlying and securing the insert in the recess; means securing the top plate to the tool holder body; and coolant passageway means formed in at least one of the tool holder body and the top plate, the coolant passageway means being focused on at least one of three critical zones. In one embodiment, the critical zone is selected from the group consisting of a first cutting edge, a second cutting edge, and a nose positioned between the pair of cutting edges. Preferably, the coolant passageway means focuses coolant on each of the first cutting edge, the second cutting edge and the nose.

The coolant passageway means comprises open sided channels cut in one of said tool holder body and the top plate, the open side being closed by at least one of i) the other of the tool holder and the top plate and ii) the insert. In one embodiment, the means to retain the top plate on the tool holder body comprises some welded portions. In another embodiment, the tool holder body is configured with a dovetail slot while the top plate has a complementary dovetail configuration on its lateral edges. A recess in one lateral edge of the top plate receives a pin that is engaged in the tool holder body to prevent movement of the top plate. Other means of securing the top plate such as soldering, gluing, conventional threaded fasteners, etc., could also be used.

The cutting tool insert is retained in the tool holder body by a combination of the top plate overlapping one edge of the insert and a conventional tilt pin which extends through an opening in the insert. Both the axial rake angle (10°) and the radial rake angle (7°) are increased from conventional tool configurations increasing tool life. Alternatively, a screw (beveled headed, flat head, Torx® drive) could be used to secure the insert in the tool holder body.

Other features, advantages and characteristics of the present invention will become apparent after a reading of the following specification.

BRIEF DESCRIPTION OF THE DRAWINGS

The preferred embodiment(s) of the present invention are set forth in the drawings, like items bearing like reference numerals and in which.

DETAILED DESCRIPTION OF THE PREFERRED EMBODIMENT(S)

Figure 1A:
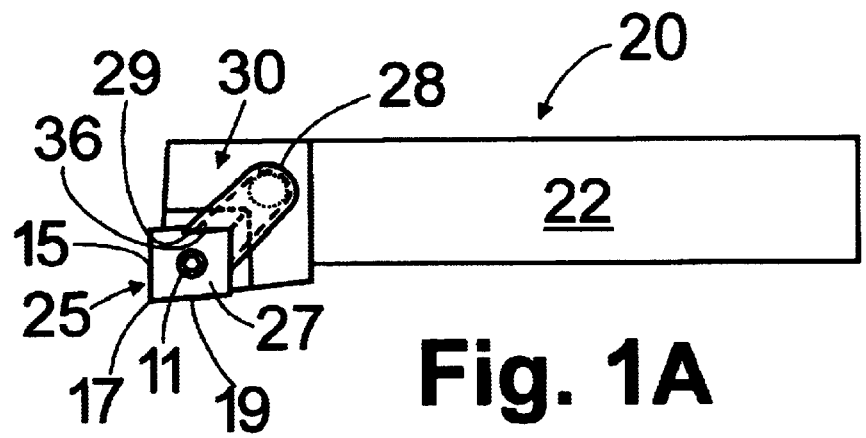
FIG. 1A is a top view of a first embodiment of the tool holder of the present invention.
Figure 1B:
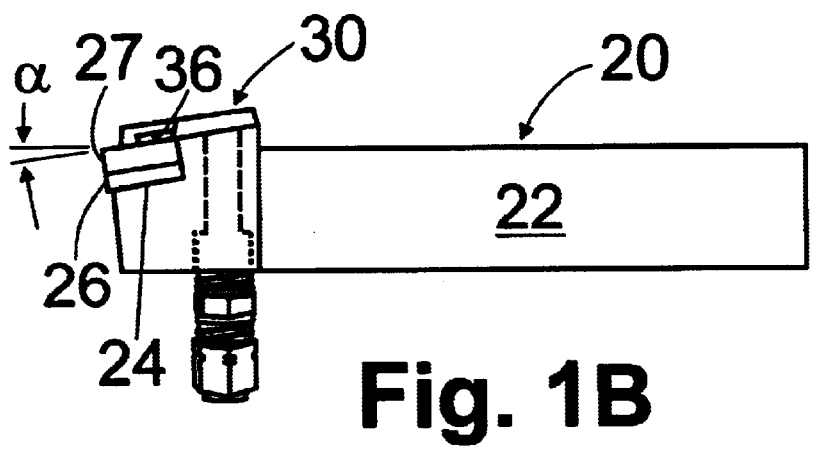
FIG. 1B is a side view of the first embodiment of the present tool holder.
Figure 1C:
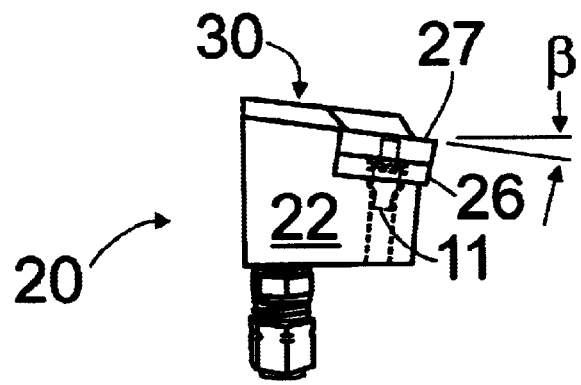
FIG. 1C is a front view of the first embodiment of the present tool holder.

A first embodiment of the indexable tool holder with coolant system is depicted in FIGS. 1A, 1B and 1C generally at 20. Tool holder 20, which is designed for use in conjunction with a lathe, or the like, includes i) tool holder body 22 with a recess 24, ii) a cutting tool insert assembly 25 that includes a spacer shim 26 and cutting tool insert 27, and iii) top plate 30. Recess 24 receives spacer shim 26 and insert 27. In this first embodiment, a separate center portion 28 of top plate 30 houses the coolant fluid delivery system 36 and an edge portion 29 overlies insert 27 to prevent its working its way loose. As shown, only a single edge portion 29 overlies the insert 27. Obviously, both edges of the top plate 30 could be machined to perform this function. A conventional tilt pin 11 is used to clamp the insert assembly 25 to the holder body 22. Overlying edge portion 29 provides a safety function in preventing the insert 27 from inadvertently popping off. If the alternative securing method of a bevel-headed clamping screw were used in place of the tilt pin 11, the overlying edge portion 29 would be typically be unnecessary. The cutting insert 27 may be indexed between four possible positions to maximize the useful life thereof. The tool holder is designed with higher radial rake angle α (7°) and axial rake angle β (10°) than normal in order to achieve enhanced tool life.

Figure 2:
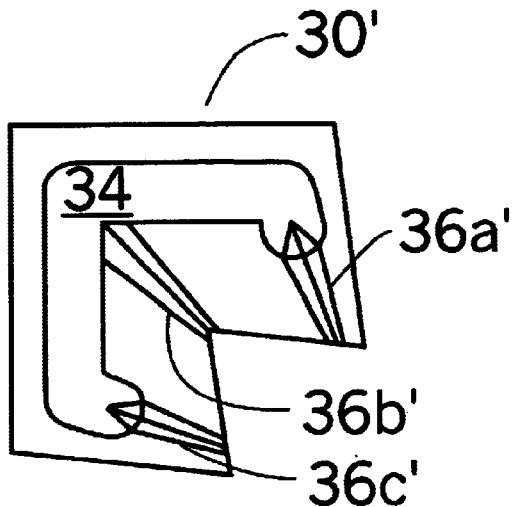
FIG. 2 is a bottom view of a top plate of a second embodiment of the tool holder of the present invention.
Figure 3A:
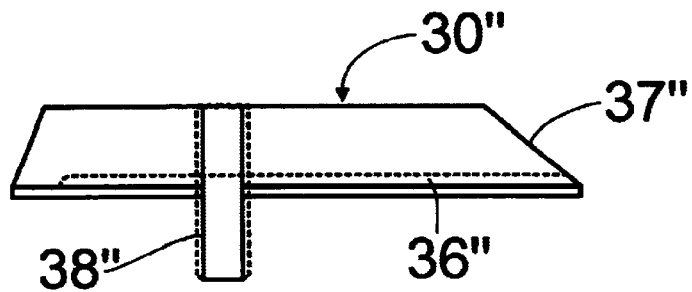
FIG. 3A is a side view of a third embodiment of the tool holder of the present invention.
Figure 3B:
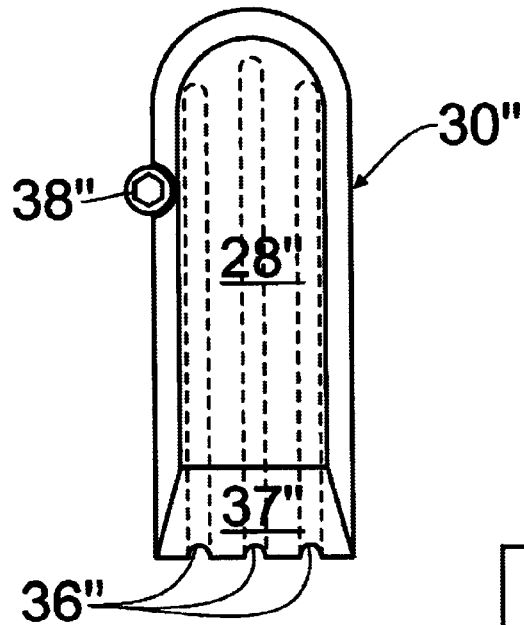
FIG. 3B is a top view of the third embodiment of the present tool holder.
Figure 3C:
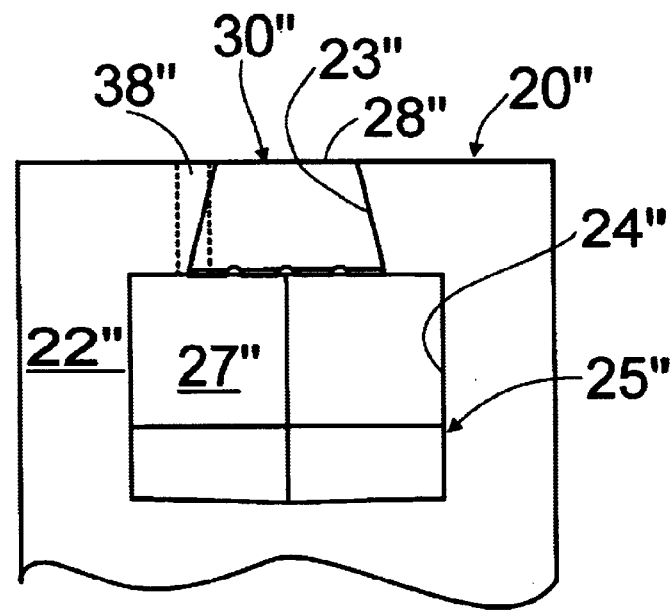
FIG. 3C is a front view of the third embodiment of the present tool holder as seen looking directly at nose 17.

A second embodiment is depicted in FIG. 2. In this embodiment, top plate 30' has a reservoir 34' machined therein which distributes coolant to three nozzle shaped conduits 36' that deliver coolant fluid to at least one critical zone of insert 27. Preferably, one of the conduits 36a' is focused at first cutting edge 15 (FIG. 1A), one 36c' at the second cutting edge 19, and the third conduit 36b' at the nose 17. In this manner, these three critical zones are kept bathed in coolant which prevents the temperature of the interface between insert 27 and the work piece (not shown) from reaching an elevated temperature which would greatly accelerate deterioration of the cutting edge(s) of insert 27 significantly reducing its wear life. Since the top plate 30' is mounted to match the rake angles α and β, and since the conduits 36' are positioned so close to the insert 27 the maximum amount of coolant arrives at the insert/work piece interface insuring optimum cooling. Most other delivery systems are positioned farther from the cutting edge and deliver fluid at a higher approach angle which has proven to be less effective at cooling. This is necessarily the case since the tool holder 20 with coolant system of the present invention delivers coolant at the lowest possible approach angle from a point immediately proximate the cutting zone. While the coolant reservoir and conduits are preferably formed in the top plate 30', it will be appreciated that these passages could be formed in the upper face of the tool holder body 22 with the top plate merely forming the upper surface thereof. The tool holder 20 of FIGS. 1A, 1B and 1C is particularly designed to be used with diamond shaped inserts 13 and may be used with high pressure, high volume coolant fluid, or low pressure, low volume coolant fluid. The principles of the invention, however, can be used with any shaped insert and any desired fluid flow, with the configuration of the holder and top plate that are adjusted accordingly. For example, FIGS. 3A, 3B, and 3C depict a third embodiment of the tool holder 20" capable of delivering high or low pressure coolant fluid along the length of a straight cutting edge of an insert which could be one of any of a number of shapes. In this embodiment, tool holder 20" has a dovetailed slot 23" above the recess 24" that receives the insert assembly 25". Once the top plate 30" is slipped into the dovetailed slot 23", pin means is used, in this case, a set screw 38" is threaded into an opening (not shown) in tool holder body 22", to secure top plate 30" in position against movement. In this embodiment, top plate 39" has a plurality of half round channels 31" grooved into its underneath surface and the bottom of the channels 36" are formed by both the bottom of dovetail slot 23" and the insert 27", whichever is underlying the channels 36". End 37" is shown beveled which is the configuration of the blank from which top plate 30" is formed. The actual final configuration of end 37" will be determined by the shape of the insert 27" and the desired distribution of the coolant fluid. It will further be understood that while three channels are shown, any number, one or more, is contemplated by the invention.

Figure 4A:
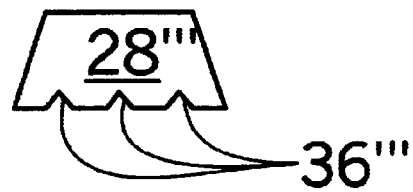
FIG. 4A is a front view of the top plate of a fourth embodiment of the present tool holder.
Figure 4B:
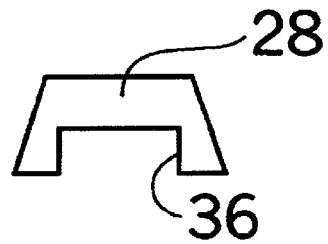
FIG. 4B is a front view of the top plate of the first embodiment of the present tool holder; and, FIG. 4C is a front view of a sixth embodiment of the present tool holder looking directly at nose 17.
Figure 4C:
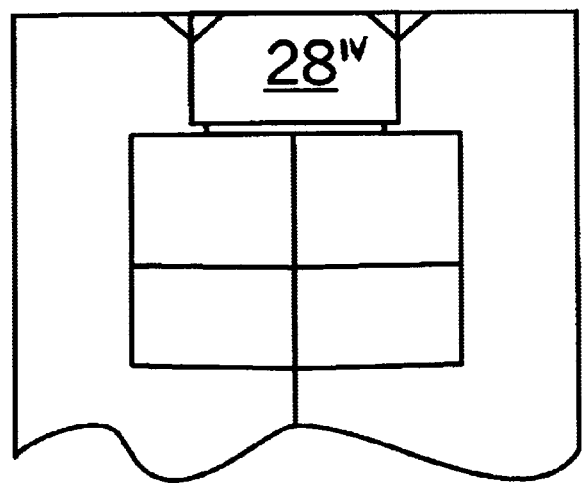

Other variations are depicted by FIGS. 4A, 4B, and 4C. FIG. 4A shows channels 36''' which are trangular shaped. This configuration has been shown to be particularly effective, in high pressure, high volume applications, at delivering coolant fluid to the targeted zone. FIG. 4B shows a channel 36 for high volume, low pressure coolant fluid delivery. This is actually the configuration depicted in the FIG. 1A embodiment. Finally, FIG. 4C depicts a plate center section 28$^{iv}$ that is secured with welded portions rather than with a dovetail and set screw.

The tool holder 20 permits coolant fluid to be delivered from short range at the same rake angles as the surface of the cutting insert 27 to optimize cooling of the insert/work piece interface thereby keeping the insert 27 below degradation temperatures. The top plate 30 may be modified in its entirety to provide coolant passageways or an insert 28 can be machined and then secured in place by either of two methods.

Various changes, alternatives and modifications will become apparent to a person of ordinary skill in the art after a reading of the foregoing specification. It is intended that all such changes, alternatives and modifications as fall within the scope of the appended claims be considered part of the present invention.

I claim:

1. An indexable insert tool holder for use with a lathe comprising
   a) a tool holder body having an upper surface portion with a particular length and a recess formed therein;
   b) a cutting tool insert assembly seated in said recess, said insert having at least one critical zone;
   c) a top plate extending over a portion of said particular length of said tool holder body adjacent said cutting tool insert assembly and having only a leading edge overlying said cutting tool insert assembly, said top plate not having primary responsibility for retaining said cutting tool insert assembly seated in said recess;
   d) means securing the top plate to the tool holder body; and
   e) open-sided coolant passageway means formed in an external surface portion of said top plate, said coolant passageway means running horizontally throughout its length, said upper surface portion of said tool holder body interfacing with said top plate defining a lower surface of said coolant passageway means, and said coolant passageway means terminating at said leading edge and being focused on said at least one critical zone.

2. The tool holder of claim 1 wherein said critical zone is selected from the group consisting of a first cutting edge, a second cutting edge, and a nose positioned between the pair of cutting edges.

3. The tool holder of claim 2 wherein said coolant passageway means focuses coolant on each of said first cutting edge, said second cutting edge and said nose.

4. The tool holder of claim 3 wherein said coolant passageway means includes a separate channel to focus coolant on each of said three critical zones.

5. The tool holder of claim 1 wherein said means securing said top plate to said tool holder body comprises welded portions between said top plate and said tool holder body.

6. The tool holder of claim 1 wherein said means securing said top plate to said tool holder body comprises a dove tail slot in said tool holder body with a complementary shape on a pair of lateral edge portions on said top plate.

7. The tool holder of claim 6, wherein said means securing said top plate to said tool holder body further comprises a recess in a lateral edge of said top plate and pin means secured in said tool holder body which seats in said recess to prevent movement of said top plate.

8. The tool holder of claim 1 further comprising means to secure said cutting tool insert in said tool holder body.

9. The tool holder of claim 8 wherein said means to secure said cutting tool insert assembly in said tool holder body comprises an overhanging lip of said top plate.

10. The tool holder of claim 9 wherein said means to secure said cutting tool insert in said tool holder body further comprises a tilt pin positioned in an opening therein.

11. The tool holder of claim 1 wherein said cutting tool insert has an axial rake angle of 10° and a 7° radial rake angle for superior tool life.

12. The tool holder of claim 1 wherein said cutting tool insert assembly comprises a spacer shim and a cutting insert.

13. The tool holder of claim 1 wherein said cooling passageway means extend linearly over their entire horizontal length without angular bends.

* * * * *